United States Patent

Le-Calve

[11] Patent Number: 5,908,094
[45] Date of Patent: Jun. 1, 1999

[54] FREEWHEEL ASSEMBLY

[75] Inventor: Marc Le-Calve, Saint-Cyr-sur-Loire, France

[73] Assignee: SKF France, Clamart Cedex, France

[21] Appl. No.: 08/835,818

[22] Filed: Apr. 16, 1997

[30] Foreign Application Priority Data

Apr. 16, 1996 [FR] France ................................. 96 04734
Oct. 4, 1996 [FR] France ................................. 96 12137

[51] Int. Cl.⁶ .................................................. F16D 15/00
[52] U.S. Cl. ..................................... 192/41 R; 192/109 R
[58] Field of Search ...................... 192/45, 45.1, 41 R, 192/109 R

[56] References Cited

U.S. PATENT DOCUMENTS

| | | | |
|---|---|---|---|
| 2,691,435 | 10/1954 | Klamp | 192/45.1 |
| 3,191,732 | 6/1965 | McDowall | 192/45 |
| 3,584,713 | 6/1971 | Tani et al. | 192/45 X |
| 4,003,457 | 1/1977 | Dahlstrom | 192/45 X |
| 5,076,408 | 12/1991 | Numata et al. | |
| 5,139,123 | 8/1992 | Rutke . | |
| 5,343,991 | 9/1994 | Premiski et al. | |
| 5,518,093 | 5/1996 | Hartig et al. | 192/45 |
| 5,672,110 | 9/1997 | Kurita et al. | 192/45 |

FOREIGN PATENT DOCUMENTS

| | | |
|---|---|---|
| 447 026 A1 | 9/1991 | European Pat. Off. . |
| 478 891 A1 | 4/1992 | European Pat. Off. . |
| 573 799 A1 | 12/1993 | European Pat. Off. . |
| 2 588 340 | 4/1987 | France . |
| 863 930 | 3/1961 | United Kingdom . |

*Primary Examiner*—Charles A. Marmor
*Assistant Examiner*—Saúl Rodríguez
*Attorney, Agent, or Firm*—Smith, Gambrell & Russell, LLP; Beveridge, DeGrandi, Weilacher & Young Intellectual Property Group

[57] ABSTRACT

A freewheel device of the type comprising a plurality of wedging cams 5 mounted in at least one holding cage 8, a plurality of rolling bodies 15 mounted in an additional cage 18, an outer race 1 equipped on its bore with a track 6 along which the cams 5 can slide and with a raceway 16 along which the rolling bodies 15 can roll, an inner race 2 equipped on its cylindrical outer surface with a track 7 along with the cams 5 can slide and with a raceway 17 along which the rolling bodies can roll, to allow the one-way coupling between the outer race 1 and inner race 2. The freewheel device comprises, on one side, an end plate 12 secured to one of the races, adjacent to the holding cage 8 and axially retaining said cage in one direction, and the additional cage 18 for holding the rolling bodies 15 comprises means of axial retention, at least in the other direction, with respect to the race supporting the end plate.

22 Claims, 4 Drawing Sheets

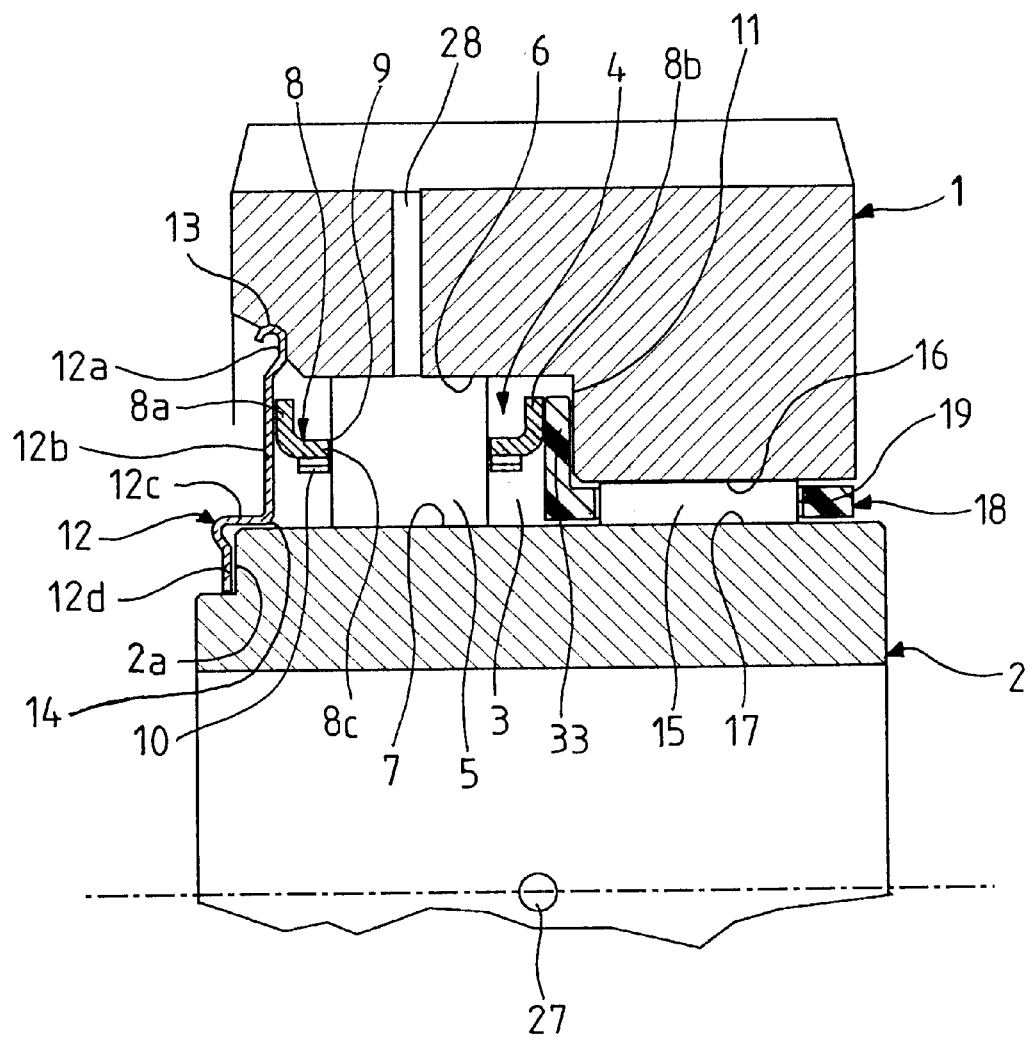
FIG_6

FREEWHEEL ASSEMBLY

The present invention relates to the field of freewheels generally arranged between an outer race and an inner race capable, in one direction, of transmitting a torque between the two races and, in the other direction, of operating as a freewheel, that is to say of allowing one of the races to have a higher rotational speed than the other race without transmitting the torque.

Document FR-A-2413582 (BORG-WARNER) discloses a freewheel assembly which includes an outer race equipped with a cylindrical inner track for the cams of the freewheel, an inner race equipped with a cylindrical outer track for the cams of the freewheel, a freewheel situated between the track of the outer race and the track of the inner race and composed of a cage with openings in which are arranged cams which, by becoming wedged between the two tracks, provide a one-way coupling between the outer race and inner race, and rolling bodies forming a bearing and intended to maintain concentricity between the outer race and the inner race and to transmit the radial loadings between the races. These bodies are held on both sides by stop segments which engage in recesses in the outer race.

These freewheel assemblies are used in many applications, particularly in converters for automatic gearboxes.

In such devices it is desirable, in order to have correct lubrication of the rolling bodies and of the cams, for these to be contained in a relatively enclosed space where a forced circulation of lubricant can more readily be provided.

In known freewheel devices, the various bodies constituting the freewheel device can become detached from one another before final assembly.

The object of the invention is therefore to construct non-dismantleable subassemblies comprising the outer race, the freewheel, the rolling bodies and their cage, in order to make handling easier and avoid dismantling and accidental loss of components during said handling.

Another object of the invention is to achieve relative axial positioning of the inner race with respect to the outer race in order to make the freewheel device easier to mount in the mechanical component for which it is intended.

The freewheel device, according to the invention, is of the type comprising a plurality of wedging cams mounted in at least one holding cage, a plurality of rolling bodies mounted in an additional cage, an outer race equipped on its bore with a track along which the cams can slide and with a raceway along which the rolling bodies can roll, an inner race equipped on its cylindrical outer surface with a track along which said cams can slide and with a raceway along which the rolling bodies can roll, to allow the one-way coupling of the outer race and inner race. The freewheel device comprises, on one side, an end plate secured to one of the races adjacent to the holding cage and axially retaining said holding cage in one direction. The additional cage for holding the rolling bodies comprises means of axial retention, at least in the other direction, with respect to the race supporting the end plate.

In one embodiment of the invention, the end plate extends in the direction of the other race and comprises a cylindrical surface forming a narrow passage with said other race, and a radial surface forming a thrust surface for a corresponding surface of said other race.

In one embodiment of the invention, the means of axially retaining the additional cage comprise at least one radial portion extending from said cage and interacting with at least one corresponding radial surface of the race supporting the end plate. The means of axially securing the additional cage may be arranged on the opposite side the cams or, on the contrary, on the side of the additional cage which lies toward the cams. In this case, the radial portion of the additional cage may be arranged axially between the cage for holding the cams and a radial shoulder of the race supporting the end plate. The additional cage is thus held axially in both directions.

Advantageously, the means of axially retaining the additional cage interact with a circular slot provided on the race supporting the end plate. The means of axially retaining the additional cage may comprise lugs extending radially into the circular slot of the race supporting the end plate.

In one embodiment of the invention, the additional cage comprises, at its opposite end to the cams, a radial flange extending in the direction of the race which does not support the end plate and interacting with at least one radial thrust surface of said race. The radial flange may interact with a circular slot provided on the race not supporting the end plate. The inner race is thus secured axially to the outer race via the cage.

As a preference, the outer race and inner race are provided with circulation ducts for a lubricant, the end plate and the additional cage playing a part in sealing.

The subassembly according to the invention is intended to constitute a freewheel device comprising a plurality of wedging cams mounted in at least one holding cage, a plurality of rolling bodies mounted in an additional cage, and a cylindrical component intended to form an outer race equipped on its bore with a track along which the cams can slide and with a raceway along which the rolling bodies can roll. The subassembly comprises, on one side, an end plate secured to the outer race, adjacent to the cage for holding the cams and retaining it axially in one direction. The additional cage for holding the rolling bodies comprises means of axial retention with respect to the race supporting the end plate, at least in the other direction.

The invention will be better understood from studying the detailed description of a few embodiments which have been taken without any implied limitation and illustrated by the appended drawings, in which:

FIG. 6 is an axial half section of a fifth embodiment of the invention.

Figure 1:
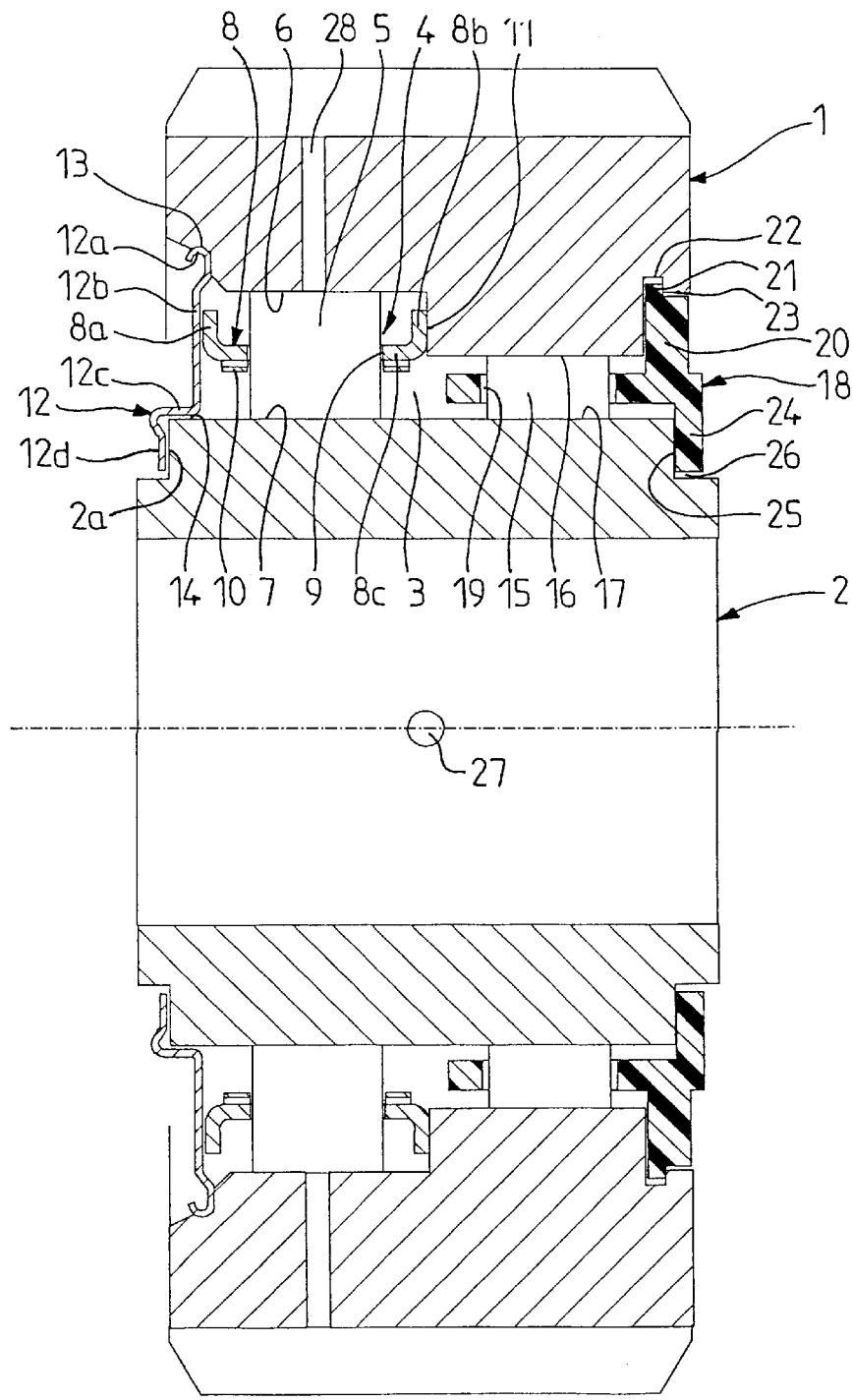
FIG. 1 is a view in axial section of a freewheel device according to a first embodiment of the invention.

As illustrated in FIG. 1, the freewheel device comprises an outer race 1 and an inner race 2 which are concentric and define an annular space 3 between them. Housed in the annular space 3 is a freewheel 4 comprising a row of cams 5 which are capable of coming into contact with a track 6 formed on a bore of the outer race 1 and a track 7 formed by an outer cylindrical surface of the inner race 2. The cams 5 are held by an annular cage 8, made for example of sheet metal. The cage 8 has a U-shaped cross section, the branches 8a and 8b of the U being radial, directed toward the outer race 1 and connected by a cylindrical portion 8c pierced with openings 9 in which the cams 5 are held. The freewheel 4 also comprises an annular spring 10 in the form of a strip, secured to the cage 8 for holding the cams 5 and exerting on each cam 5 a force which tends to tilt the cams 5 in the wedging direction. The cage 8 bears axially via its branch 8b against a radial shoulder 11 of the outer race 1. The other branch 8a of the cage 8 bears axially against an end plate 12 secured to the race 1.

The end plate 12 comprises a portion 12a for securing to a circular slot 13 provided in the outer race 1. It is also possible to envisage push fitting the end plate over a cylindrical bearing surface of the race supporting it. From the securing portion 12a, the end plate 12 extends substantially radially in the direction of the inner race 2 and comprises a first radial portion 12b in contact with the branch 8a of the cage 8, a cylindrical portion 12c extending toward the outside of the annular space 3, and, at its free end, a second radial portion 12d. The cylindrical portion 12c and the radial end portion 12d form a narrow passage 14 with the inner race 2. The radial end portion 12d forms an axial thrust surface which can come into contact with the radial surface 2a of the inner race 2.

Also arranged in the annular space 3 is a row of cylindrical rollers 15 in contact with a raceway 16 formed by a bore in the outer race 1 of smaller diameter than the track 6 for the cams 5 on account of the shoulder 11, and with a raceway 17 formed by an outer cylindrical surface of the inner race 2. The track 7 for the cams 5 is of the same diameter as the raceway 17 for the rollers 15. The cylindrical rollers 15 are held in place by a cage 18 made of a synthetic material, of annular shape and including openings 19 in which the rollers 15 are held. At its opposite axial end to the freewheel 4 the cage 18 comprises a radial part 20 extending, on the one hand, in the direction of the outer race 1 and, on the other hand, in the direction of the inner race 2. The radial part 20 of the cage 18 comprises, close to the outer race 1, a plurality of lugs 21 of a shape which is designed to interact with a circular slot 22 in the outer race 1. The cage 18 and the rollers 15 are thus axially immobilized with respect to the outer race 1. The radial part 20 forms, in addition, with the outer race 1, a narrow passage 23. The radial part 20 of the cage 18 in the direction of the inner race 2 forms a radial flange 24 which forms a narrow passage 26 with a radial surface 25 of the inner race 2.

The radial flange 24 also forms an axial thrust surface in contact with the radial surface 25 of the inner race 2. Thus any axial movement of the inner race 2 is limited in one direction by the radial end portion 12d of the end plate 12 and, in the other direction, by the radial flange 24 of the cage 18. Once assembled, the freewheel device can be handled without risk.

The inner race 2 is pierced with a radial inlet duct 27 for a lubricant, which duct emerges axially between the rollers 15 and the freewheel 4 in the annular space 3. The outer race 1 is pierced with radial outlet ducts 28 for the lubricant, these being arranged axially in the region of the cams 5 of the freewheel 4.

In operation, cylindrical rollers 15 ensure perfect concentricity between the outer race 1 and the inner race 2. Axially, the rollers 15 are secured to the outer race 1 on account of the axial holding of the cage 18 thanks to the lugs 21 interacting with the slot 22 in the outer race 1. The radial flange 24 of the cage 18 can come into contact with the radial surface 25 of the inner race 2, forming a thrust surface, and limits any axial movement of the inner race 2. The cams 5 of the freewheel 4 are kept in contact with their tracks 6 and 7 thanks to the spring 10 and are held axially by the cage 8. The end plate 12 secured to the outer race 1 limits any axial movement of the freewheel 4.

To reduce wear, friction, and avoid any risk of seizure of the freewheel device, a lubricant which is introduced through the ducts 27 of the inner race 2 and which leaves via the ducts 28 of the outer race 1 is circulated through the annular space 3. As the cylindrical portion 12c and the radial end portion 12d of the end plate 12 form a narrow passage 14 with the inner race 2, and the radial flange 24 of the radial part 20 of the cage 18 forms a narrow passage 26 with the radial surface 25 of the inner race 2, and the radial part 20 of the cage 18 also forms a narrow passage 23 with the outer race 1, lubricant leakage is negligible. The freewheel 4 and the cylindrical rollers 15 tend constantly to be bathed in the lubricant lying inside the annular space 3.

Figure 2:
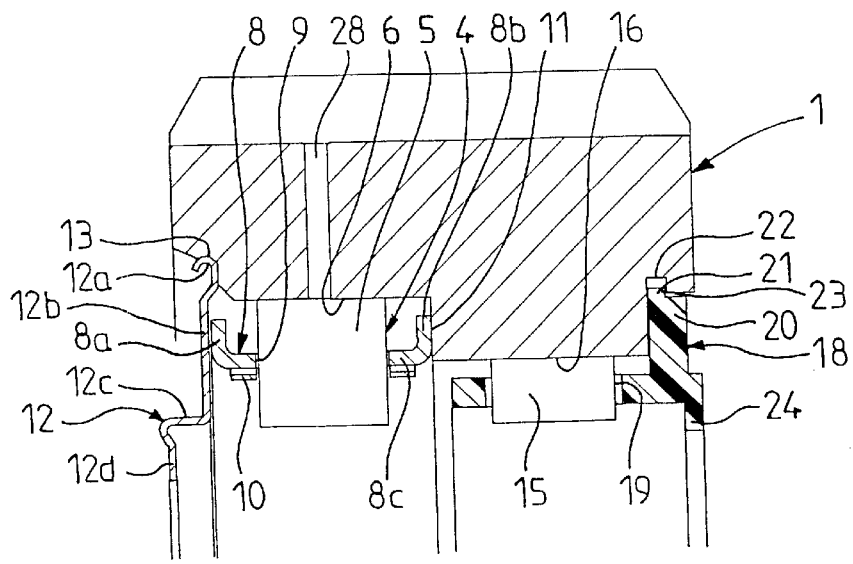
FIG. 2 is an axial half section of a subassembly of a second embodiment of the invention.

As can be seen in FIG. 2, there is no risk of the subassembly comprising the outer race 1, the freewheel 4, the end plate 12, the rolling bodies 15 and the cage 18 becoming dismantled accidentally or of components becoming lost during handling. This is because the freewheel 4 is axially blocked on one side by the shoulder 11 of the outer race 1 and on the other side by the end plate 12. The rolling bodies 15 are held by the cage 18 which is itself axially secured to the outer race 1 thanks to the lugs 21 which project into the slot 22 of the outer race 1. The outer race 1 and inner race 2 are, in addition, axially positioned one with respect to the other.

Figure 3:
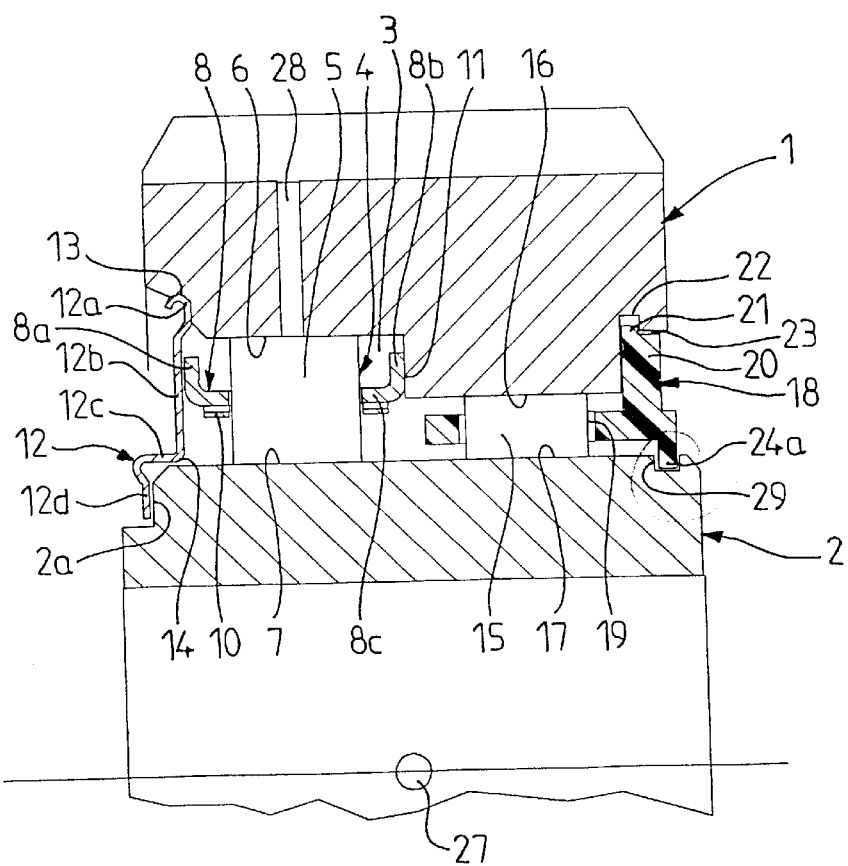
FIG. 3 is an axial half section of the complete freewheel device corresponding to FIG. 2.

The freewheel device illustrated in FIGS. 2 and 3 is similar to that of FIG. 1, except that the radial flange 24 of the radial part 20 of the cage 18 is not as broad and that its free end 24a is housed in a slot 29 provided on the outer cylindrical surface of the inner race 2. The free end 24a of the radial flange 24 may be continuous or, on the contrary, cut into lugs, which makes it easier to mount the inner race 2. The cage 18 allows the outer race 1 and the inner race 2 to be secured axially. It is thus possible to form a subassembly identical to the one illustrated in FIG. 2 and to introduce the inner race 2 axially from the side including the cage 18 until said inner race 2 comes into abutment against the end plate 12 and the free end 24a of the flange penetrates the slot 29 by elasticity.

Figure 4:
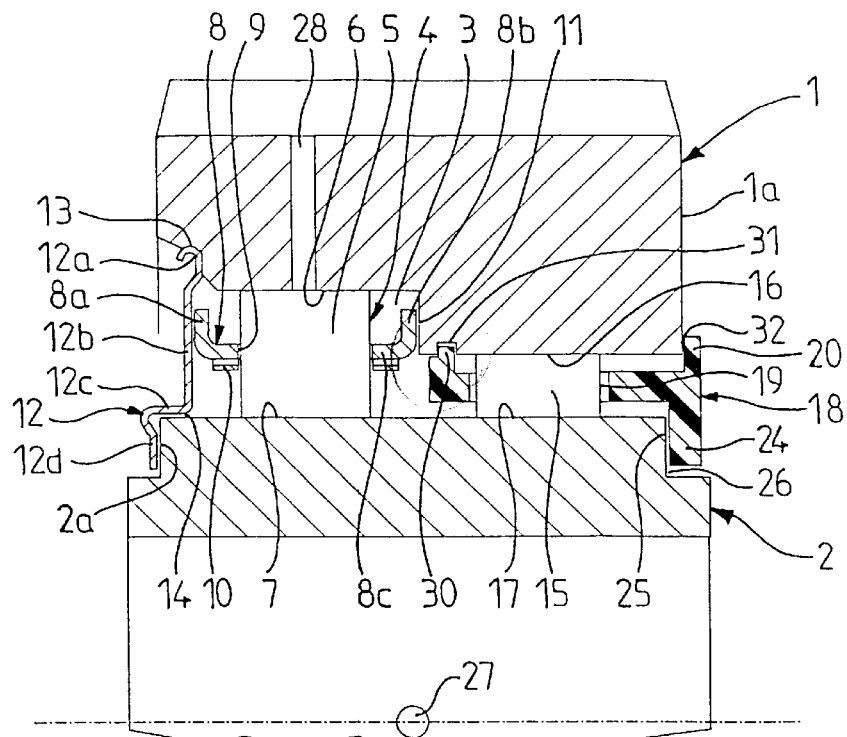
FIG. 4 is an axial half section of a third embodiment of the invention.

The embodiment illustrated in FIG. 4 is similar to that of FIG. 1, except that the cage 18 at its left side which lies toward the cams comprises a radial extension 30 which may be continuous or cut into lugs and which is housed in a slot 31 provided in the bore of the inner race 1 close to the shoulder 11. The cage 18 comprises a radial portion 20 which extends in the direction of the outer race 1 to form a narrow passage 32 with the front surface 1a of this race. The cage 18 thus seals the annular space 3 and is axially secured to the outer race 1 in both directions.

Figure 5:
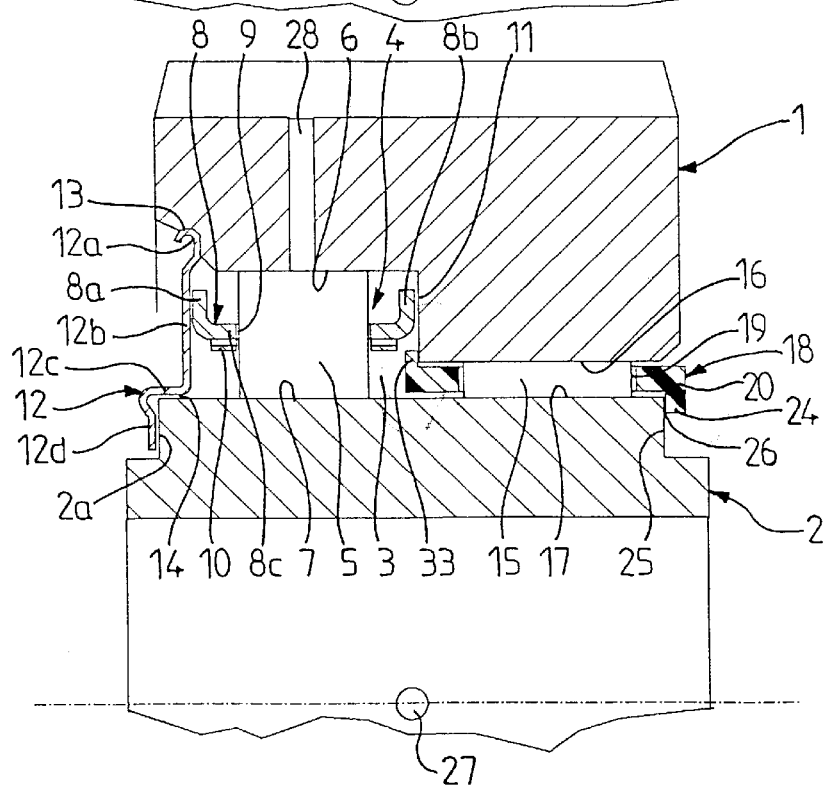
FIG. 5 is an axial half section of a fourth embodiment of the invention.

The embodiment illustrated in FIG. 5 is similar to that of FIG. 1 except that the cylindrical rollers are replaced with cylindrical needles also referenced 15 and held by a cage 18 which at its end on the same side as the freewheel 4 comprises a radial extension 33 in the form of a radial flange or of radial lugs in contact with the shoulder 11 of the outer race 1. The radial part 20 of the cage 18 here is smaller and extends merely in the direction of the inner race 2 to form a small-sized radial flange 24 (or alternatively radial lugs) in contact with the radial surface 25 of the inner race 2. The inner race 2 is thus retained axially in one direction by the end plate 12 and in the other direction by the flange 24 of the cage 18 which is itself retained by the radial extension 31 in contact with the shoulder 11 of the outer race 1.

This last embodiment is particularly economical owing to the absence of slot in the outer race 1 or inner race 2.

The embodiment illustrated in FIG. 6 is similar to that of FIG. 5 except that the cage 18 has no radial part on the opposite side to the cams 5 and comprises a radial extension 33 of sufficient size to come into contact with the branch 8b of the cage 8. The radial extension 33 is thus trapped between the shoulder 11 of the outer race 1 and the cage 8, and the cage 18 is axially immobilized in one direction by the shoulder 11 and in the other direction by the cage 8 itself in contact with the end plate 12. This immobilization is brought about before the mounting of the inner race 2 and without requiring any machining, especially of radial surfaces, thereon.

In the embodiments which have just been described, the end plate 12 is mounted on the outer race 1. However, it could be mounted on the inner race using similar securing means. The outer race would then come into abutment axially against a radial surface of the end plate.

The additional cage holding the rolling bodies would then include means of axial retention with respect to the inner race, at least in one direction.

Thanks to the invention, a freewheel device is obtained the life of which is lengthened thanks to excellent lubrication, and which can be handled easily and without the risk of losing components before it is installed in the mechanical component for which it is intended, generally an automatic gearbox.

I claim:

1. A freewheel device comprising a plurality of wedging cams mounted in at least one holding cage, a plurality of rolling bodies mounted in an additional cage, an outer race equipped on its bore with an outer track along which the cams can slide and with an outer raceway along which the rolling bodies can roll, an inner race equipped on its cylindrical outer surface with an inner track along which said cams can slide and with an inner raceway along which the rolling bodies can roll, said cams being lockable between said races to provide one-way coupling of the outer race and inner race, the additional cage being provided with means of axial retention of the additional cage with respect to one of the races, an end plate on one side of the freewheel device and secured to one of the races, adjacent to the cage for holding the cams and axially retaining said holding cage in one direction, said wedging cams being located between said end plate and said rolling bodies, said means of axial retention of the additional cage being capable of retaining the additional cage in a direction which is opposite to said one direction.

2. The freewheel device as claimed in claim 1, wherein the end plate (12) extends in the direction of the other race and comprises a cylindrical surface forming a narrow passage with the other race, and a radial surface forming a thrust surface for a corresponding surface of the other race.

3. The freewheel device as claimed in claim 2, wherein the means of axially retaining the additional cage (18) comprise at least one radial portion (20) extending from said cage and interacting with at least one corresponding radial surface of the race supporting the end plate.

4. The freewheel device as claimed in claim 3, wherein the means of axially retaining the additional cage are arranged on the opposite side to the cams.

5. The freewheel device as claimed in claim 3, wherein the means of axially retaining the additional cage are arranged on the same side as the cams.

6. The freewheel device as claimed in claim 5, wherein the radial portion (33) of the additional cage is arranged axially between the cage for holding the cams and a radial shoulder (11) of the race supporting the end plate.

7. The freewheel device as claimed in claim 2, wherein the means of axially retaining the additional cage interact with a circular slot provided on the race supporting the end plate, the means of axially retaining the additional cage comprising lugs (21) extending radially into the circular slot provided on the race supporting the end plate.

8. The freewheel device as claimed in claim 2, wherein the additional cage comprises, at its opposite end to the cams, a radial flange (24) extending in the direction of the inner race and interacting with at least one radial thrust surface (25) of said inner race.

9. The freewheel device as claimed in claim 2, wherein the additional cage comprises, at its opposite end to the cams, a radial flange extending in the direction of the outer race and interacting with at least one radial thrust surface of said outer race.

10. The freewheel device as claimed in claim 1, wherein the means of axial retention of the additional cage comprise at least one radial portion extending from said cage and interacting with at least one corresponding radial surface of the race supporting the end plate.

11. The freewheel device as claimed in claim 10 wherein the means of axial retention of the additional cage are arranged on an opposite side of the additional cage from the cams.

12. The freewheel device as claimed in claim 10, wherein the means of axial retention of the additional cage are arranged on a side of the additional cage which lies toward the cams.

13. The freewheel device as claimed in claim 12, wherein the radial portion (33) of the additional cage is arranged axially between the cage for holding the cams and a radial shoulder (11) of the race supporting the end plate.

14. The freewheel device as claimed in claim 1, wherein the means of axial retention of the additional cage interact with a circular slot provided on the race supporting the end plate, the means of axial retention of the additional cage comprising lugs extending radially into the circular slot provided on the race supporting the end plate.

15. The freewheel device as claimed claim 1, wherein the additional cage comprises, at its opposite end to the cams, a radial flange (24) extending in the direction of the inner race and interacting with at least one radial thrust surface (25) of said inner race.

16. The freewheel device as claimed in claim 15, wherein the radial flange interacts with a slot (29) provided on the outer cylindrical surface of the inner race.

17. The freewheel device as claimed in claim 1, wherein the additional cage comprises, at its opposite end to the cams, a radial flange extending in the direction of the outer race and interacting with at least one radial thrust surface of said outer race.

18. The freewheel device as claimed in claim 17, wherein the radical flange interacts with a circular slot provided in the bore of the outer race.

19. The freewheel device as claimed in claim 1, wherein the outer race and inner race are provided with circulation ducts (27, 28) for a lubricant, the end plate (12) and the additional cage (18) playing a part in sealing.

20. The freewheel device as claimed in claim 1 wherein said end plate is separate from both of said races.

21. A subassembly intended to constitute a freewheel device comprising a plurality of wedging cams mounted in at least one holding cage, a plurality of rolling bodies mounted in an additional cage, a cylindrical component intended to form an outer race equipped on its bore with a track along which the cams can slide and with a raceway along which the rolling bodies can roll, the additional cage being provided with means of axial retention of said additional cage with respect to the outer race, which subassembly includes an end plate on one side of the subassembly and secured to the outer race adjacent to the holding cage, said end plate retaining the holding cage axially in one direction, said wedging cams being located between said end plate and said rolling bodies, said means of axial retention of the additional cage being capable of retaining the additional cage at least in a direction which is opposite to said one direction.

22. A subassembly according to claim 21 wherein said end plate is separate from both of said races.

* * * * *